W. O. TALBOT.
DENTIST'S BALANCE.
APPLICATION FILED APR. 22, 1910.
1,002,784.
Patented Sept. 5, 1911.
2 SHEETS—SHEET 1.
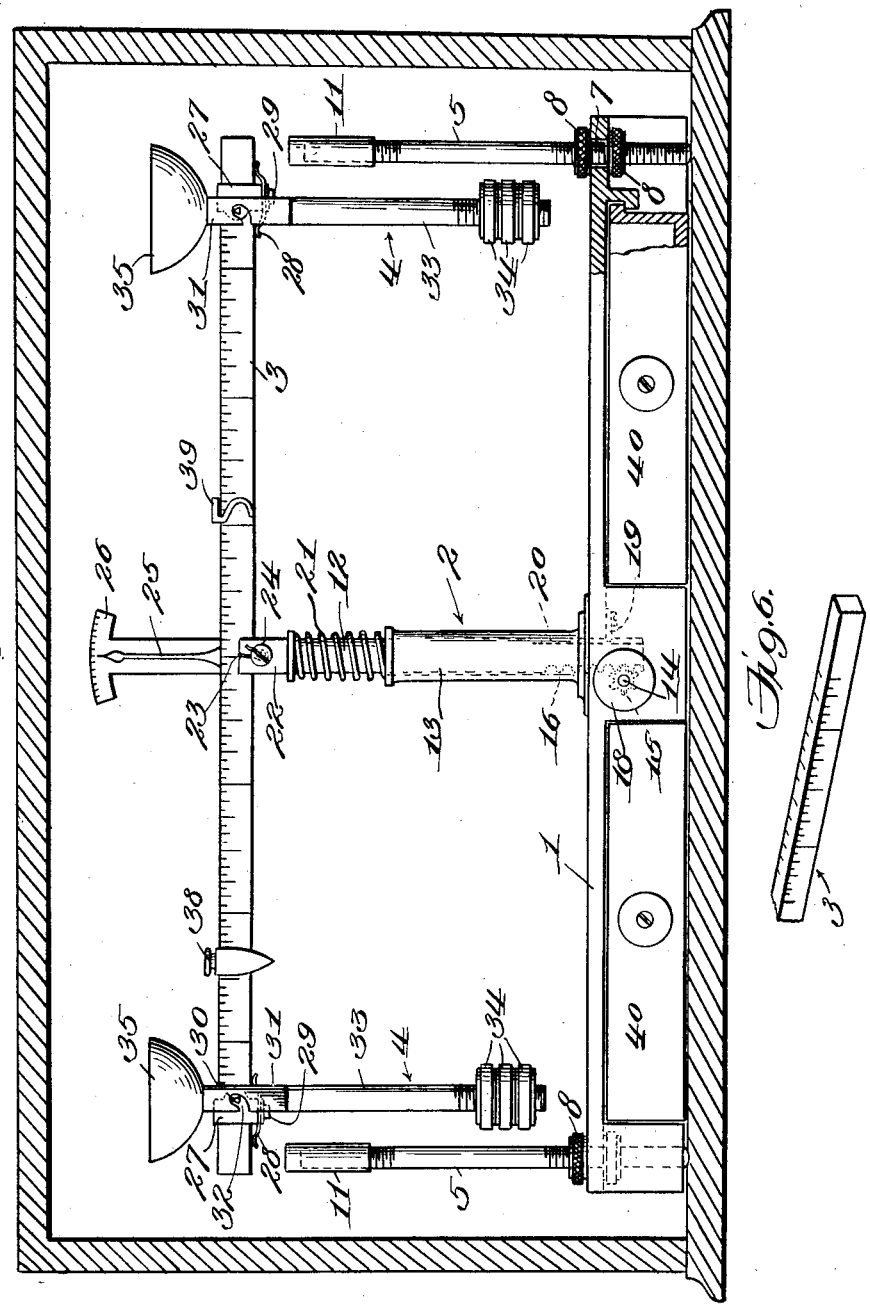
Witnesses
C. F. Kesler
J. J. McCarthy
Inventor
William O. Talbot
By
James L. Norris Jr.
Atty.

W. O. TALBOT.
DENTIST'S BALANCE.
APPLICATION FILED APR. 22, 1910.
1,002,784.
Patented Sept. 5, 1911.
2 SHEETS—SHEET 2.
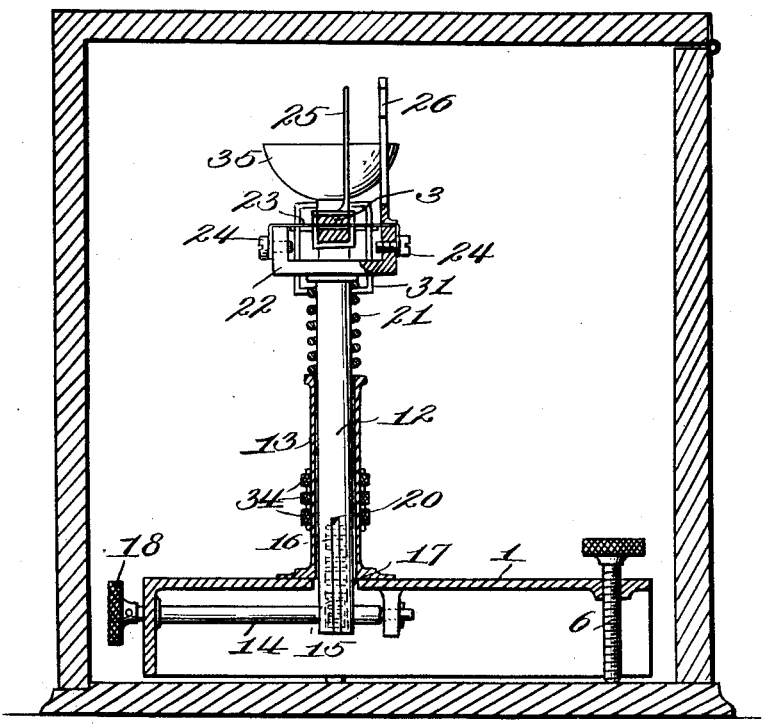
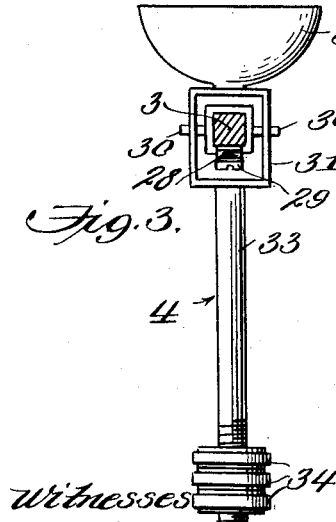
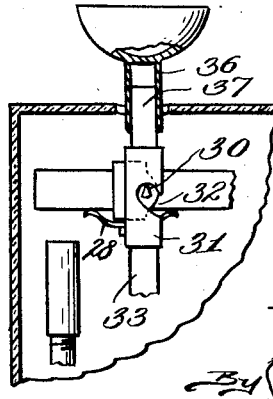
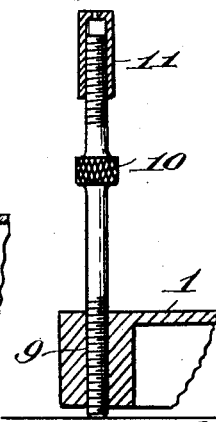
Witnesses
C. Kesler
J. J. McCarthy
Inventor
William O. Talbot
By James L. Norris,
Atty.

UNITED STATES PATENT OFFICE.

WILLIAM O. TALBOT, OF BILOXI, MISSISSIPPI.

DENTIST'S BALANCE.

1,002,784.  Specification of Letters Patent.  Patented Sept. 5, 1911.

Application filed April 22, 1910. Serial No. 557,004.

*To all whom it may concern:*

Be it known that I, WILLIAM O. TALBOT, a citizen of the United States, residing at Biloxi, in the county of Harrison and State of Mississippi, have invented new and useful Improvements in Dentists' Balances, of which the following is a specification.

The present invention has reference to improvements in dentists' balances, and it comprehends the production of an instrument of that type which may be utilized with equal facility for weighing any definite quantity of material and balancing therewith a definite and unequal portion of another material, or for balancing two equal or unequal portions of material without weighing either portion.

Specifically, it resides in the particular construction of the scale beam, the support for the same and the pendants associated with said beam, and in the particular manner in which the beam and pendants are mounted.

It further contemplates the provision of improved devices for leveling the base of the instrument and for obtaining the necessary initial adjustment of the beam.

A structural embodiment of the invention is illustrated in the accompanying drawings, wherein:

Figure 1 is a front elevation of the improved balance. Fig. 2 is a central transverse vertical sectional view thereof. Fig. 3 is an enlarged detail view in elevation of one of the pendants, showing the manner in which the same is mounted upon the beam, the beam being shown in cross-section. Fig. 4 is a fragmental sectional side elevation showing a modification of the arrangement shown in Fig. 3. Fig. 5 is a detail sectional side elevation of a modified form of leveling post. Fig. 6 is a fragmental perspective view of the beam.

In said drawings, 1 indicates, generally, the base of the instrument, 2 the standard, 3 the beam mounted upon the latter, and 4 the pendants.

The parts above referred to are inclosed within a suitable casing which may be constructed either of wood or glass, the base 1 being supported upon the floor of the casing and maintained in level position by means of devices comprising a pair of adjustable posts 5 and a screw 6. Posts 5 are in the form of bolts and have their upper and lower portions threaded, the latter portions passing through openings formed adjacent the front corners of the base; where the walls of the openings 7 are plain, as shown in Fig. 1, pairs of locking nuts 8 disposed upon opposite sides of the base are employed to retain the posts in adjusted position, but where the corners of the base are thickened and the walls of the openings 9 are threaded, (Fig. 5), the nuts are unnecessary and may be omitted, the bolts in this instance being provided with milled enlargements 10, whereby they may be turned. The screw 6 above referred to projects through a threaded opening formed centrally of the base adjacent the rear edge thereof. The threaded upper portions of the two posts are provided with adjustable caps 11. By operating the posts and the screw in the obvious manner, it will be apparent that the base of the instrument may be caused to assume an exactly level position within the casing.

Standard 2 comprises inner and outer telescoping sections 12 and 13, the latter of which is tubular and is fastened at its lower end upon the base 1 exactly midway between the two posts 5 and directly in front of screw 6. The inner section is arranged for free sliding movement within the outer section, and accordingly has associated therewith an operating device which may advantageously comprise, as shown, a shaft 14 supported beneath the base and provided with a pinion 15 meshing with a series of rack teeth 16 formed upon the lower portion of the section, said toothed portion projecting through an opening 17 formed in base 1. The front end of shaft 14 extends through an opening in the front wall of the base and carries an operating head or wheel 18, which, when turned, will effect a corresponding movement of the lower section, as will be apparent, the latter being held against rotation at such time by means of a finger 19 or analogous device secured to the under surface of the base and projecting at its free end into a longitudinal groove 20 formed in said section. It may be stated, however, that the inner section 12 is normally held in elevated position by means of a suitable spring 21 which surrounds the upper portion thereof and is interposed between the upper end of the section 13 and the bottom or body portion of a U-shaped bar 22 mounted upon the upper end of section 12. This bar has the free ends of its upstanding legs formed with notches wherein are received the end portions of a fine wire 23 stretched tightly across said bar and removably connected at its terminals to a pair of adjusting screws 24 tapped into said legs. Wire 23 constitutes the carrier or pivotal support for beam 3, the latter being in the form of a bar of non-oxidizable metal having a central horizontal perforation through which the wire loosely passes. Beam 3 is rectangular in cross-section, and its front face, (and, preferably also its upper face) is graduated, the graduations on one face constituting a metric scale, and those on the other face an apothecary's scale. At the exact center of its upper face, the beam is provided with a needle or pointer 25 arranged for coöperation with a dial 26 mounted upon the rear leg of bar 22, the needle pointing to the center of the dial when the scale beam is in a state of equilibrium.

At the ends of the beam are located a pair of sliding collars 27 from which the pendants 4 are suspended, as hereinafter described. Against the bottoms of these collars are arranged bowed springs 28, the ends of which bear against the lower face of the beam. The tension of the springs is controlled by means of set-screws 29, between the heads of which latter and said springs, washers are interposed. The sides of collars 27 are provided with lateral projections 30 constituting bearings which are designed to support the stirrups 31 at the upper ends of the pendants 4. These projections are received in slots 32 formed in the stirrup sides and may be sharpened, if so desired. In the construction illustrated, the stirrups are rectangular in form and are mounted directly upon the upper ends of the bolt-like stems 33 of the pendants, the lower portions of said stems being threaded, to admit of the attachment of the weights 34 thereto. To the stirrups are also connected the bowls 35 which support the weighing pans or trays, (not shown), or which may themselves contain the materials to be weighed. These bowls may be fastened directly to the top members of the stirrups, as shown in Fig. 1, or they may be provided with depending tubular stems 36 which fit telescopically upon upstanding pins 37 mounted upon the stirrups, as shown in Fig. 4. The latter construction is preferred when a glass casing is employed, the bowls, needle and dial being arranged above the casing top in this instance, as is customary; where a wooden casing is made use of, it is preferably so constructed that the front and top thereof may be raised, (see Fig. 2).

With the beam there are associated suitable poises 38 and weights 39, slidably mounted thereon, the latter preferably upon the right hand arm of the beam, and the former upon the left-hand arm thereof. The down-turned front wall of the base may, if desired, be cut away at points, to afford openings through which a pair of drawers 40 may be moved.

The operation of the instrument may be stated as follows: The base 1 is first leveled in the manner above described, after which the beam is lowered bodily, by turning wheel 18 in the proper direction, until the ends of the beam rest upon the caps 11 on posts 5; either cap may then be adjusted until the needle 25 points to the exact center of the dial 26, whereafter the wheel is released and the beam raised to its operative position by the action of spring 21. When it is desired to weigh material in one bowl only, and to utilize the other bowl for receiving the weights, both collars are moved the ends of the scale, i. e., at equal distances from the center of the beam, and the weight 39 and poise 38 removed, although the former may, if preferred, be moved to the exact center of the beam. If eight grains or less of material are to be measured out, this may be effected by means of the weight 39 alone, no weights being required for the second bowl. The principal functions of the instrument, however, are to balance two unequal portions of material, and to weigh one portion of material and balance therewith a definite unequal portion of another material. The first object may be obtained by placing the two collars on the corresponding percentage points of the beam; when the materials are deposited in the bowls or pans and the beam reaches a balance, the proportions of the two materials will be correct. The second object may be obtained by placing one collar at exactly one hundred (100) metric points from the center of the beam—for example on the left-hand beam end—and then weighing the lesser portion of material in the corresponding bowl or pan by means of the weight 39; when this operation has been completed, weight 39 is moved to the center of the beam, and the right-hand collar is shifted along the beam to a point representing the percentage or proportion of the lesser portion of material to the greater portion to be mixed therewith, after which the greater portion of material may be deposited in the second bowl or pan until a balance is reached.

In any one of the operations above described, the beam may be steadied, after reaching a state of approximate equilibrium by being lowered until its ends touch the post-caps 11, and then slowly raised.

I claim as my invention:

1. The combination, in a balance, of a standard; a U-shaped bar mounted on the top thereof; a wire stretched across the legs of said bar; a scale beam pivoted centrally upon said wire; a collar slidably mounted on each end of said beam and provided with a pair of lateral bearings; and a pendant suspended from each collar, each pendant including a rocking saddle straddling the corresponding collar and having its opposite sides formed with slots wherein the bearings of said collar are received.

2. The combination, in a balance, of a standard; a U-shaped bar mounted on the top thereof; a wire stretched across the legs of said bar; a scale beam pivoted centrally upon said wire; a collar slidably mounted on each end of said beam; a tension spring associated with each collar and having its ends bearing against the adjacent face of the beam; a screw carried by each collar for regulating the tension of the corresponding spring; and a pendant suspended from each collar.

3. The combination, in a balance, of a base; a standard mounted thereon and comprising inner and outer telescopically-arranged sections; a bar mounted on the top of the inner section; a scale beam pivotally connected centrally with said bar; a pendant suspended from each end of said bar; and a spring associated with said inner section for normally holding the same in elevated position.

4. The combination, in a balance, of a base; a standard mounted thereon and comprising inner and outer telescopically-arranged sections, the inner section having its lower portion formed with a series of rack teeth; a bar mounted on the top of said inner section; a scale beam pivotally connected centrally with said bar; a pendant suspended from each end of said beam; a shaft journaled beneath said base; a pinion carried by said shaft in mesh with said teeth, for raising or lowering said inner section when said shaft is rotated; and a spring associated with said inner section for normally holding the same in elevated position.

5. The combination, in a balance, of a base; a standard mounted thereon and including a vertically movable section; a bar attached to the top of said section; a scale beam pivotally connected centrally with said bar; a pair of posts connected to said base and arranged directly below the ends of said beam; a cap adjustably mounted on the top of each post; and means associated with said movable section for lowering the same and said beam, to bring the ends of the latter into contact with said caps.

In testimony whereof I have hereunto set my hand in presence of two subscribing witnesses.

WILLIAM O. TALBOT.

Witnesses:
H. H. RORF,
S. K. DAY.

Copies of this patent may be obtained for five cents each, by addressing the "Commissioner of Patents, Washington, D. C."